United States Patent [19]

Wilkinson

[11] Patent Number: 5,177,610
[45] Date of Patent: Jan. 5, 1993

[54] TELEVISION STANDARDS CONVERTERS

[75] Inventor: James H. Wilkinson, Tadley, United Kingdom

[73] Assignee: Sony Broadcast and Communications Ltd., Hampshire, United Kingdom

[21] Appl. No.: 820,813

[22] Filed: Jan. 15, 1992

[30] Foreign Application Priority Data

Feb. 4, 1991 [GB] United Kingdom ............... 9102335

[51] Int. Cl.⁵ .............................................. H04N 7/01
[52] U.S. Cl. ..................................... 358/140; 358/105
[58] Field of Search ............................... 358/140, 105

[56] References Cited

U.S. PATENT DOCUMENTS

| 5,068,722 | 11/1991 | Sugiyama | 358/105 |
| 5,089,887 | 2/1992 | Robert | 358/105 |
| 5,095,354 | 3/1992 | Sokawa | 358/105 |

Primary Examiner—Howard W. Britton
Attorney, Agent, or Firm—Alvin Sinderbrand; William S. Frommer

[57] ABSTRACT

A television standards converter for converting an input digital video signal from one television standard to another, comprises a high-pass filter (36) for filtering the input video signal horizontally and vertically, a plurality of parallel processing channels comprising respective circuits (43 to 58) for determining pixel by pixel of the high-pass filtered video signal the correlation magnitudes for a range of horizontal and vertical pixel offsets, low-pass filters (59) for filtering the resulting correlation magnitudes, a selecter (62) for determining for each pixel of said video signal, from the relationship between motion vector magnitude and the correlation magnitude, the motion vector corresponding to the maximum correlation magnitude, and a temporal interpolator (FIG. 14) for deriving interpolated fields or frames by combining sample values offset by the motion vectors.

10 Claims, 15 Drawing Sheets

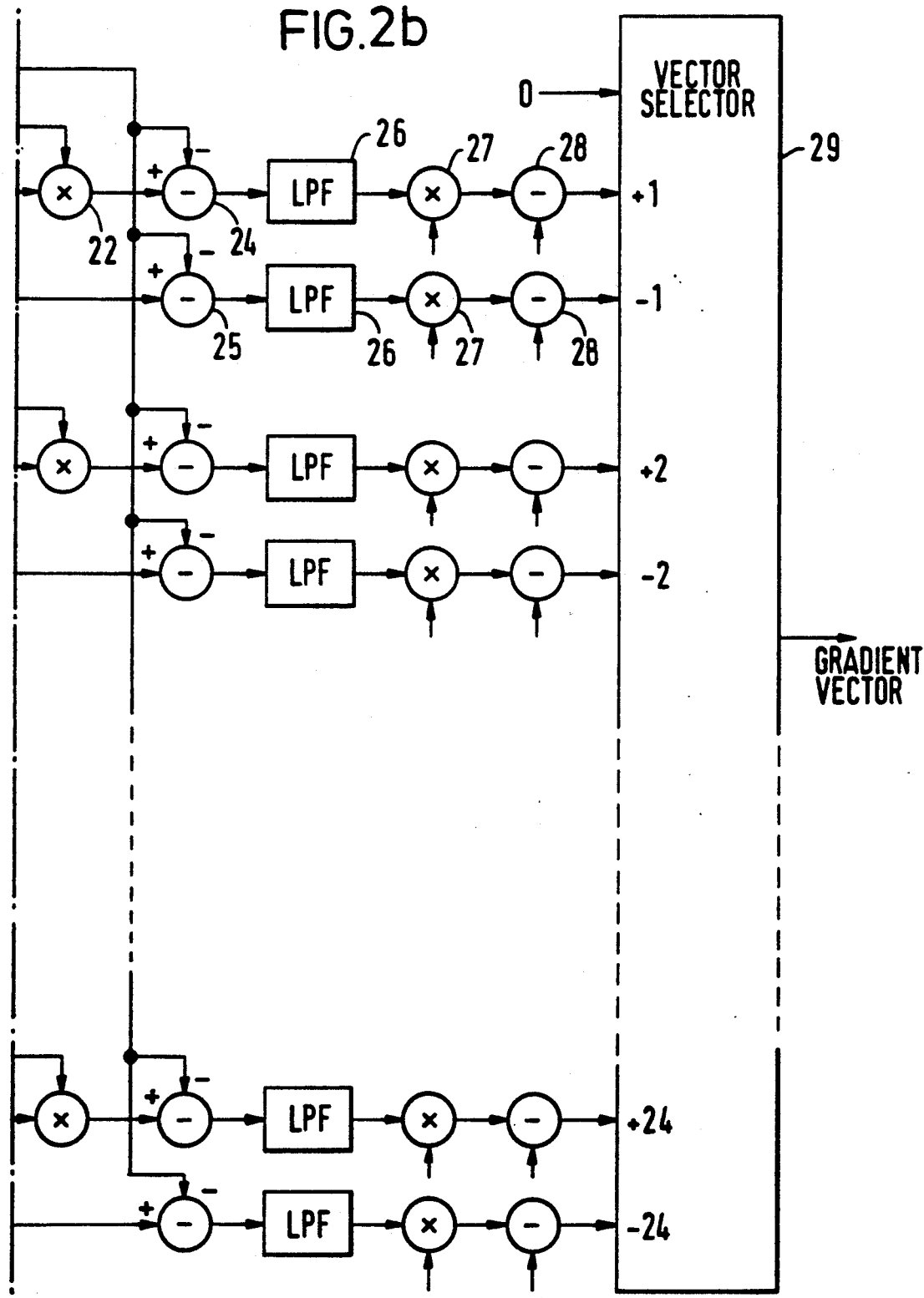

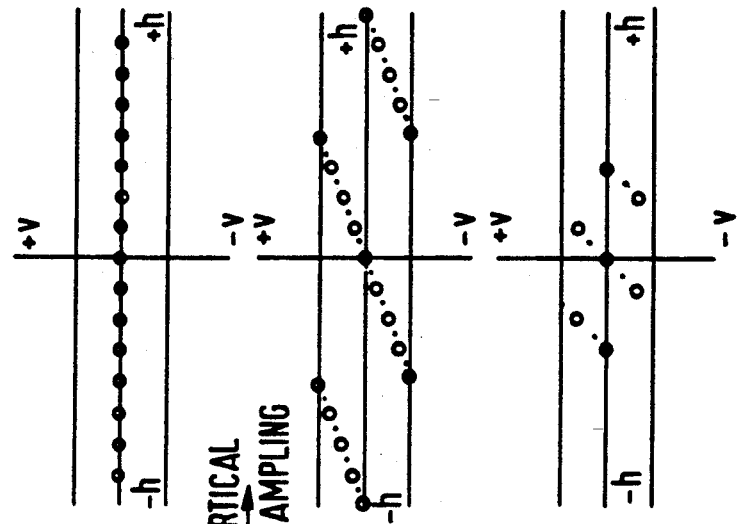
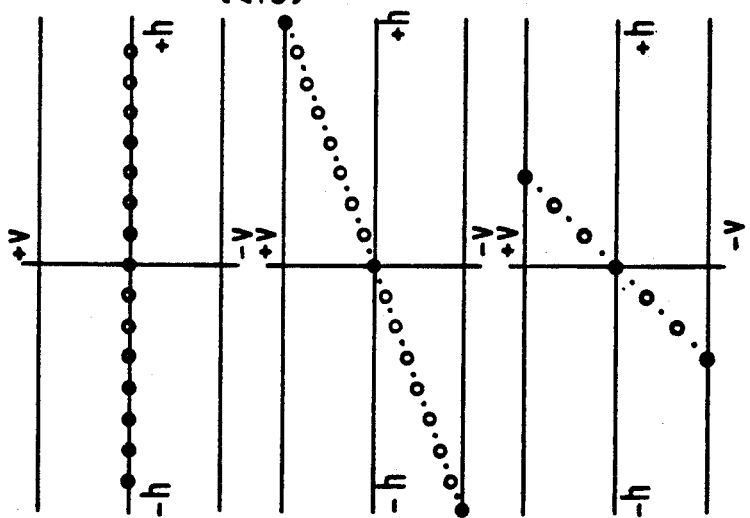
FIG. 4a
FIG. 4b
FIG. 4c

Offset Angle = 0

Offset Angle = π/4

Offset Angle = π/2

Offset Angle = 3π/4

Offset Angle = π

FIELD A    FIELD B

KEY:
- ● SOURCE PIXELS
- ⊗ SPATIALLY INTERPOLATED PIXELS
- ● TEMPORALLY INTERPOLATED PIXELS
- ○ LINEARLY INTERPOLATED PIXELS

TELEVISION STANDARDS CONVERTERS

BACKGROUND OF THE INVENTION

1. Field of the Invention

This invention relates to television standards converters.

2. Description of the Prior Art

Television standards converters are well known devices used to convert video signals from one television standard to another, for example, from a 625 lines per frame, 50 fields per second (625/50) standard to a 525 lines per frame, 60 fields per second (525/60) standard. Video standards conversion cannot be achieved satisfactorily merely by using simple linear interpolation techniques, because of the temporal and vertical alias which is present in a video signal. Thus, simple linear interpolation produces unwanted artefacts in the resulting picture, in particular, the pictures are blurred vertically and judder temporally.

To reduce these problems it has been proposed that video standards converters should use adaptive techniques to switch the parameters of a linear interpolar in dependence on the degree of movement in the picture represented by the incoming video signal.

'Methods of Gradient Vector Compensated Image Processing' by J. H. Wilkinson and G. A. Walker, Third Image Processing Conference, 1989, outlines investigations into techniques for creating accurate gradient vectors used as pointers for intra-field interpolation of 2:1 interlaced scanning systems.

Attention is also drawn to Sony Corporation's European patent specification EP-A1-0 393 906 which discloses subject matter generally similar to that of the above-mentioned paper. The present invention is concerned with the further problem of creating accurate motion vectors which can be used as pointers for inter-field interpolation, thereby enabling a television standards converter to be developed.

SUMMARY OF THE INVENTION

One object of the present invention is to provide an improved television standards converter.

Another object of the present invention is to provide a television standards converter in which motion vectors are used as pointers for inter-field interpolation.

Another object of the present invention is to provide a television standards converter in which for each pixel of a video signal a motion vector is selected in dependence on the relationship between motion vector magnitude and correlation magnitude.

According to the present invention there is provided a television standards converter for converting an input digital video signal from one television standard to another, the standards converter comprising:

a high-pass filter for filtering said input video signal horizontally and vertically;

a plurality of parallel processing channels comprising respective means for determining pixel by pixel of the high-pass filtered video signal the correlation magnitudes for a range of horizontal and vertical pixel offsets;

respective low-pass filters for filtering the resulting said correlation magnitudes;

means for determining for each pixel of said video signal, from the relationship between motion vector magnitude and correlation magnitude, the motion vector corresponding to the maximum correlation magnitude; and a temporal interpolator for deriving interpolated fields or frames by combining sample values offset by said motion vectors so determined.

Preferably, said maximum correlation magnitude is determined by applying scaling and threshold values to said motion vectors; locating the first positive and negative motion vector peaks; if the motion vector magnitude associated with these two peaks is less than a predetermined magnitude, interpolating intermediate samples either side of each said peak; and checking for and if found selecting a larger peak.

Preferably, said input video signal is converted from an interlaced digital video signal to a progressive scan digital video signal before derivation of said motion vectors, and the television standards converter further comprises:

a second high-pass filter for filtering said input interlaced video signal;

a second plurality of parallel processing channels comprising respective means for determining pixel by pixel of the low-pass filtered interlaced video signal the correlation magnitudes for a range of pixel offsets;

respective second low-pass filters for filtering the resulting said correlation magnitudes;

means for determining for each pixel of said interlaced video signal, from the relationship between motion vector magnitudes and correlation magnitudes, the gradient vector corresponding to the maximum correlation magnitude; and a spatial interpolator for deriving interpolated frames of said progressive scan video signal by combining sample values offset by said gradient vectors.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 4 to 11 are diagrams used to explain the derivation of gradient vectors and motion vectors, and are generally applicable to both. In more detail:

FIGS. 4a to 4c show the spectra of source images with rotating spatial angles;

FIG. 5 shows the effect of pixel shifting on given source frequencies;

FIG. 6 shows frequency characteristics of a basic product vector detector;

FIG. 8 shows frequency characteristics of a modified product vector detector;

FIG. 9 shows pairs of positive and negative vector detector outputs with near $\pi$ phase error between sources;

DESCRIPTION OF THE PREFERRED EMBODIMENT

The embodiment of television standards converter to be described spatially interpolates the fields of an input interlace scanned digital video signal to form a progressive scan digital video signal, and then spatially and temporally interpolates the progressive scan video signal to form the required fields of the output, standards converted, interlace scanned digital video signal. Each of these stages of interpolation is vector assisted.

Throughout this specification the vectors used in the first stage interpolation, that is the spatial or two-dimensional stage, are referred to as gradient vectors, and the vectors used in the second stage interpolation, that is the spatial and temporal or three-dimensional stage, are referred to as motion vectors.

Figure 1:
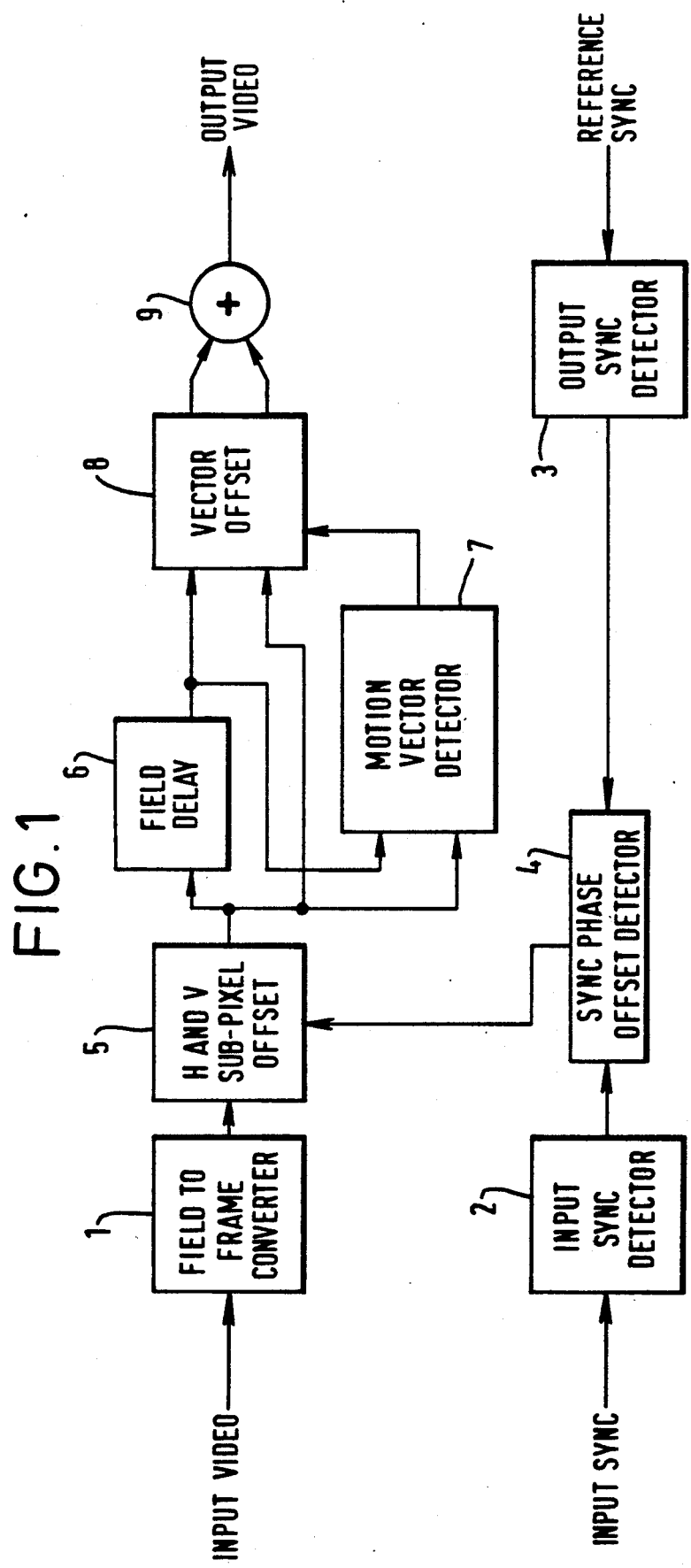
FIG. 1 is a simplified block diagram of an embodiment of motion compensated television standards converter according to the present invention.

Thus as shown in FIG. 1, the input video signal is supplied to a field to frame converter 1 wherein the progressive scan video signal is derived using gradient vector assisted interpolation. The effect of the field to frame conversion is to improve the resolution of the original image. An input sync signal derived from the input video signal is supplied to an input sync detector 2, while a reference sync signal for the output video signal is supplied to an output sync detector 3. The outputs of the sync detectors 2 and 3 are compared in a sync phase offset detector 4, the output of which is supplied to a horizontal (H) and vertical (V) sub-pixel offset device 5, outputs from which are supplied to a field delay 6, to a motion vector detector 7, and to a vector offset device 8. The output of the field delay 6 is supplied to the motion vector detector 7, and to the vector offset device 8 which supplies outputs to an adder 9, the output of which forms the required output video signal. The vector offset device 8 comprises random access memory in which the required pixel points as determined by the motion vectors are accessed.

The field to frame converter 1, which will now be described in more detail with reference to FIG. 2, derives gradient vectors for use in the spatial interpolation of the input interlace scanned video signal to form frames of a progressive scan video signal, that is a signal comprising frames at the field rate, or in other words a signal comprising fields each with a complete complement of scan lines and not merely the odd or even scan lines.

The input video signal is first passed through a low-pass filter 11, the purpose of which is to simplify the subsequent processing. A typical cut-off frequency for the low-pass filter 11 is 5 MHz, although it may be preferable in some embodiments to use a lower cut-off frequency such as 3 MHz.

The video signal is next filtered by a high-pass filter 12 which would typically be of the Hilbert type (described in, for example, 'Theory and Application of Digital Signal Processing', L. Rabiner and B. Gold, Prentice Hall, 1975, ISBN 0-13-914101-4). The high-pass filter 12 of the Hilbert type has the effect of differentiating the video signal, hence providing a clear distinction between positive and negative object edges. A typical cut-off frequency is 0.5 MHz.

The video signal is then subjected to a sub-pixel interpolation process in a half-pixel offset plus phase shift device 13. The object of this sub-pixel interpolation is to ensure that each gradient vector is aligned with the intended interpolation point. In the case of the present field-to-frame conversion, the interpolation is in the ratio 2:1, and simple half-pixel shifting is required only for the odd valued vectors. It is also possible to apply sub-pixel processing in each vector processing path after the correlation low-pass filter referred to below, where the signal bandwidth is very low and sub-pixel interpolation is very simple to implement. The output of the high-pass filter 12 is also supplied to a phase shift device 14.

The phase shifts effected by the half-pixel offset plus phase shift device 13 and the phase shift device 14 are required for odd vector offsets. Thus to ensure that the vectors are correctly centred, the half-pixel offset of the half-pixel offset plus phase shift device 13 is required for the odd paths referred to below. More generally, different phase shifts will be required if the interpolation is more complex than 2:1, for example, in the case of line rate converters, such as a 32:15 line rate converter.

The resulting phase-shifted video signals are then supplied to a plurality of paths equal in number to the previously selected number of possible values of gradient vector, in the present case 24. (As will be seen below, each of these paths may be viewed as a pair of paths.) The output of the half-pixel offset plus phase shift device 13 is supplied to the odd paths, that is the first to twenty-third paths, and the output of the phase shift device 14 is supplied to the even paths, that is the second to twenty-fourth paths. The output of the phase shift device 14 is also supplied to an additional path, designated the zero path.

The zero path comprises a delay device 15, which supplies outputs to a delay device 16 and to one input of a multiplier 17, to the other input of which is supplied the output of the delay device 16. The delay device 15 effects a delay of T, which is a compensating delay to compensate for transmission delays elsewhere in the circuitry. The delay device 16 effects a delay of H, which is one horizontal scan line delay. The output of the multiplier 17 is a zero offset correlation product which is used in the other paths as will be described below.

The first to twenty-fourth paths are generally similar to one another, and the first path will be described as an example. The path comprises four series-connected delay devices 18, 19, 20 and 21. The outputs of the delay devices 18 and 21 are supplied to respective inputs of a multiplier 22. The outputs of the delay devices 19 and 20 are supplied to respective inputs of a multiplier 23.

The delay devices 18 to 21 effect delays of $T-S/2$, $S$, $H-S$, and $S$ respectively, where $S$ is a one sample (that is, one pixel), delay.

The output of the multiplier 22 is supplied to the positive input of a subtracter 24, while the output of the multiplier 23 is supplied to the positive input of a subtracter 25. To the negative inputs of the subtracters 24 and 25 are supplied the zero offset correlation product referred to above. The purpose of the subtraction step is to reduce some of the undesirable correlation products, and the inclusion of this step is preferable, but not essential.

The outputs of the subtracters 24 and 25 are supplied to respective identical paths each comprising a series-connected low-pass finite impulse response filter 26, multiplier 27 and subtracter 28. The low-pass filter 26 has a cut-off frequency of approximately 1 MHz. The design of the low-pass filter 26 must ensure minimum over-shoots in the time domain in order to prevent spurious gradient vector selection. The low-pass filter 26 will therefore be characterized by a gentle roll-off characteristic.

The filtered signals may, at this point, be sub-sampled for the purpose of reducing hardware requirements. Sub-sampling is permissible because the signals have a relatively low bandwidth.

The signal is now subjected to scaling and weighting in dependence on the gradient vector magnitude. Scaling involves multiplication in the multiplier 27 by a factor of less than unity, which reduces the magnitude of the associated gradient vector signal. Weighting is a process in which a value, proportional to the gradient vector magnitude, is subtracted in the subtracter 28 from the magnitude of the associated gradient vector signal. Both scaling and weighting have the effect of reducing the chance of large gradient vectors being selected. Both processes may be achieved using a look-up table stored in a programmable read-only memory (PROM), the required characteristics being determined, for each vector path, by the appropriate scaling and weighting factors.

Figure 2A:
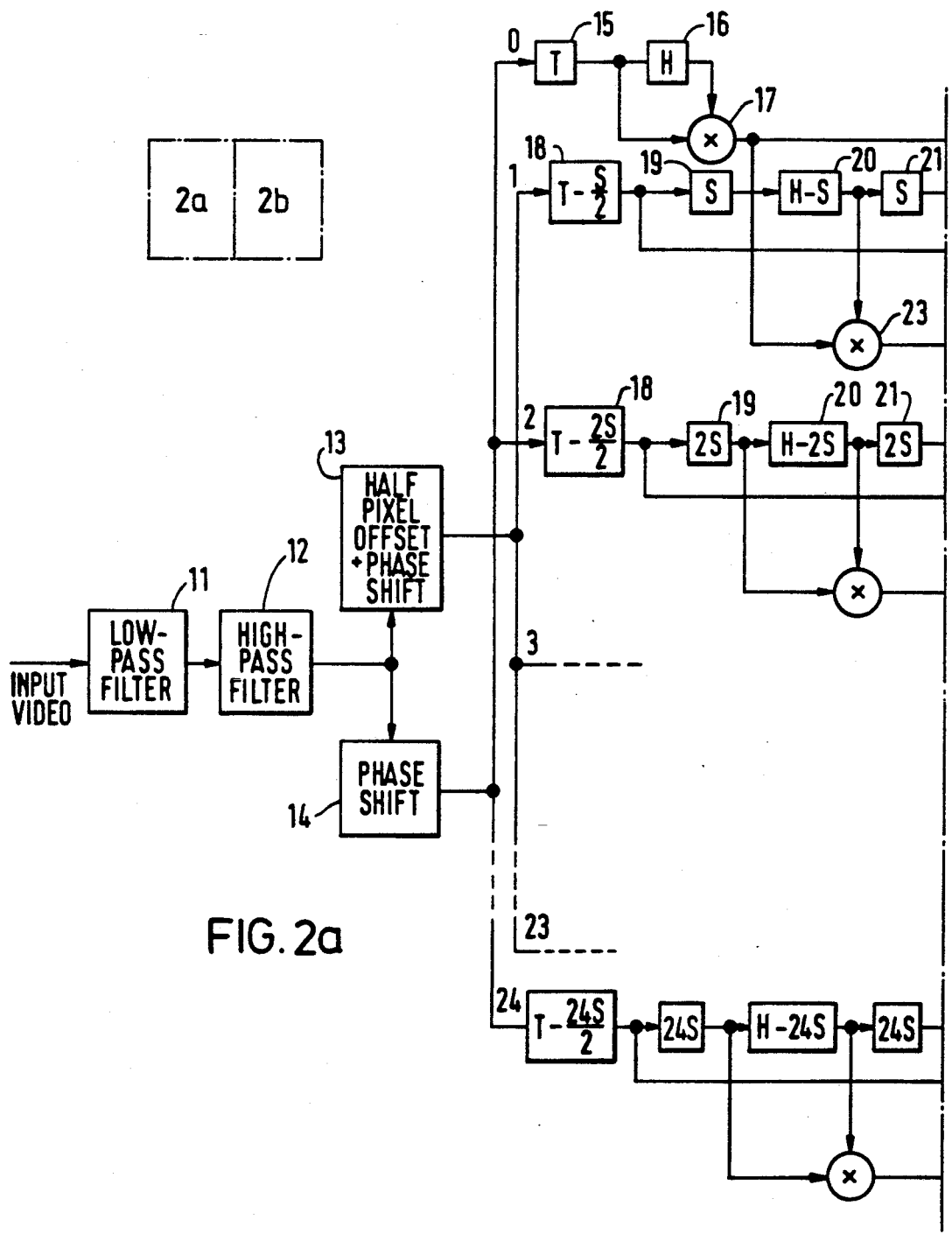
FIG. 2 (made up of FIGS. 2a and 2b drawn on separate sheets) shows part of a field to frame converter of FIG. 1 in more detailed block diagrammatic form.

The elements 15 to 20 are as indicated duplicated in each of the second to twenty-fourth paths, with the difference that in these paths the delays effected by the delay devices 18 to 21 are, for the nth path, where n is in the range 2 to 24, $T-nS/2$, $nS$, $H-nS$, and $nS$, respectively, as indicated in FIG. 2.

The final stage of the gradient vector detection is the selection of the optimum gradient vector. This is achieved, in principle, by the use of a magnitude detector forming a vector selector 29, the purpose of which is to locate the path with the largest magnitude. However, due to the fact that the video signal is sampled and the correlation process is not continuous, a search algorithm is applied as described in more detail below. The result is a gradient vector which allows improved vertical interpolation for the required scan line rate conversion.

The method of achieving the actual scan line rate conversion in the field to frame converter 1 (FIG. 1) is referred to in more detail below, it probably being more convenient first to turn to a more detailed description of the motion vector detector 7 (FIG. 1) because of the similarity to the corresponding parts of the field to frame converter 1 (FIG. 1) just described.

Figure 3A:
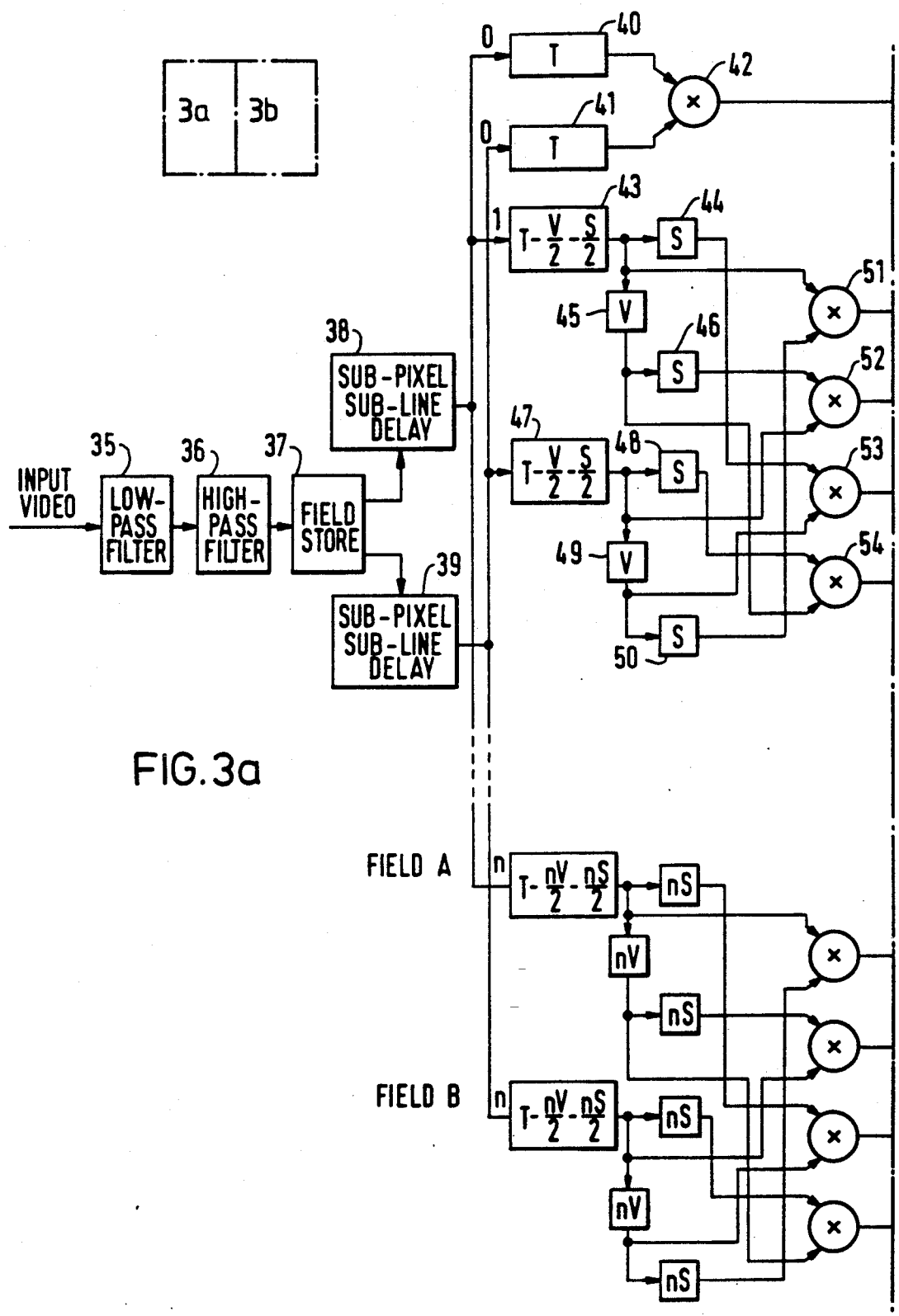
FIG. 3 (made up of FIGS. 3a and 3b drawn on separate sheets) shows part of a motion vector detector of FIG. 1 in more detailed block diagrammatic form.
Figure 3B:
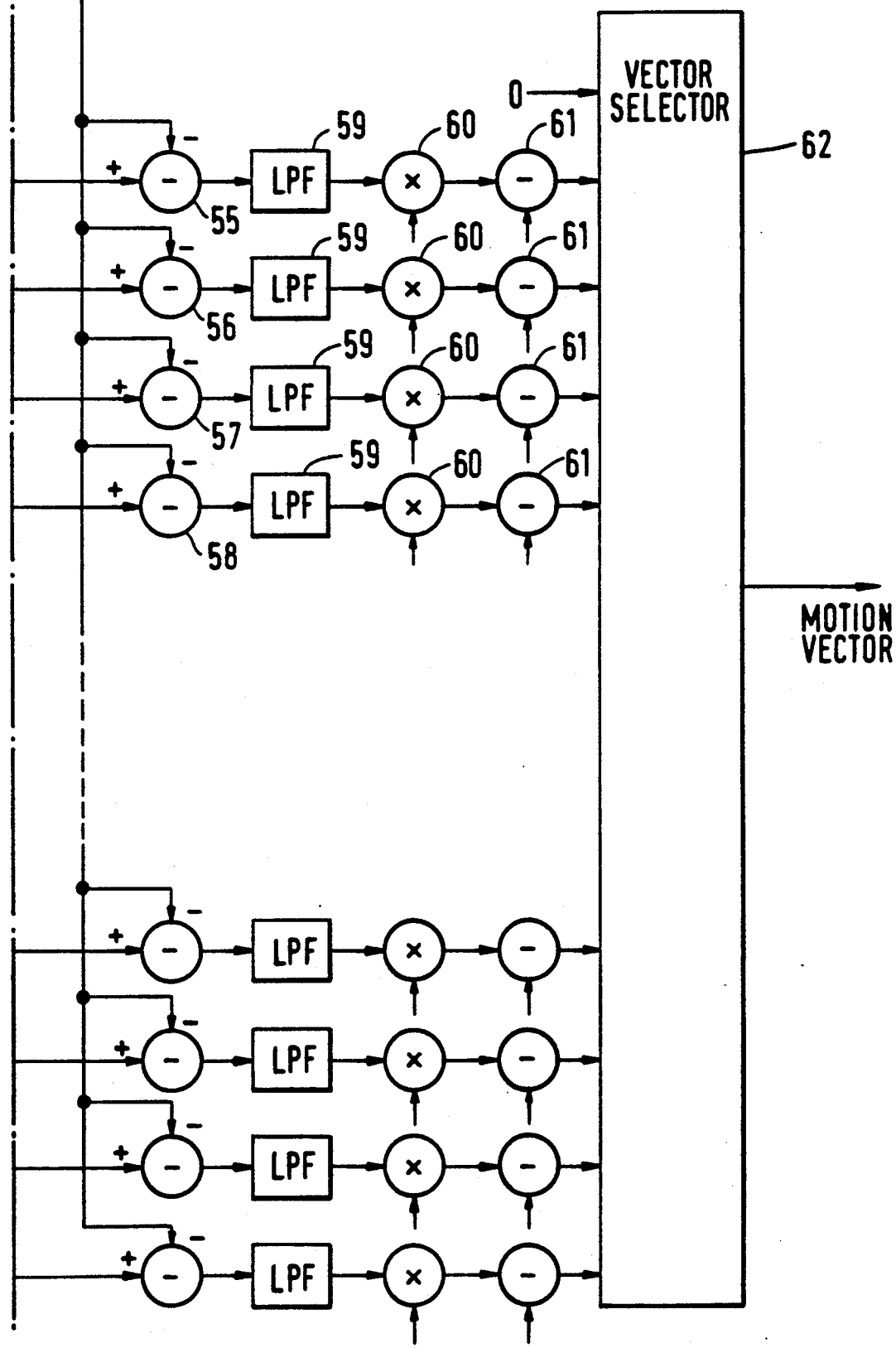

Referring now to FIG. 3, this shows the motion vector detector 7 (FIG. 1) in more detail. What in effect is being done here is to extend the above-described two-dimensional process to a three-dimensional process.

The field to frame converter 1 (FIG. 1) operates to produce two full resolution frames separated by a field sample period, that is 20 msec in the case of a 625/50 input video signal, the necessary interpolation using the gradient vectors derived as described with reference to FIG. 2. Each of these pictures is assumed to have been sampled within the Nyquist limit both along the horizontal scan and the vertical scan direction. This assumption allows standard linear interpolation techniques to be used in the next stage spatial and temporal interpolation to obtain sub-pixel points in both the horizontal and vertical directions.

The actual motion vector detector used is basically the same as the gradient vector detector described above with reference to FIG. 2. There are two possible filter sets for this motion vector detector. The simpler one uses simple horizontal filters throughout, the more complex one uses spatial filters which are two-dimensional and hence considerably more complex. In both cases, the motion vector magnitude range is assumed to be over a spatial area of plus or minus 24 horizontal pixels and plus or minus 16 vertical pixels. This results in a total number of parallel processing paths of $49 \times 33$, that is 1617. Because of the number of parallel processing paths, the field delay required prior to the correlation process is brought outside the parallel paths into the front end of the motion vector detection process to save hardware.

As shown in FIG. 3, the input video signal is first passed through a low-pass filter 35, the purpose of which is to simplify the subsequent processing. A typical cut-off frequency for the low-pass filter 35 is 5 MHz (horizontal cut-off), although it may be preferred in some embodiments to use a lower cut-off frequency, such as 3 MHz. A filter with both horizontal and vertical cut-off frequencies may also be used.

The video signal is next filtered by a high-pass filter 36 which will typically be of the Hilbert type referred to above. Thus, as mentioned above, a filter of the Hilbert type has the effect of differentiating the signal, hence providing a clear distinction between positive and negative object edges. A typical cut-off frequency is 0.5 MHz. If a two-dimensional high-pass filter is to be used, then a normal finite impulse response high-pass filter must be used, since a Hilbert type filter cannot be configured in more than one dimension. A field store 37 for the field delay referred to above is then provided to allow access to two adjacent pictures for vector estimation. The field store 37 in fact holds two normal fields of pixels, due to the field to frame conversion process. Thus, at the output of the field store 37 there are two video paths, and the video signal in each of these paths is passed to a sub-pixel interpolation process which is effected in a sub-pixel sub-line delay device 38 or 39, respectively. The respective outputs are referred to as the field A video signal and the field B video signal. This process is essentially two-dimensional and the sub-pixel shift may be in either or both the horizontal and vertical directions. The object of sub-pixel interpolation is to ensure that each motion vector is aligned with the intended interpolation point.

The video signal is now split into a plurality of paths equal in number to the number of possible values of the motion vectors, 1617 in the present example. (As will be seen below, each of these paths may be viewed as a group of four paths.) For each path the video signal is subjected to horizontal and vertical delay processes in order correctly to align two signals for the correlation process, and to ensure that the output correlation values are correctly aligned with each other.

Each of the field A and field B video signals is supplied to each of these paths, which are designated the first to nth paths, and each of the field A and field B video signals is also supplied to an additional path, designated the zero path.

The zero path comprise a delay device 40 supplied with the field A video signal, and a delay device 41 supplied with the field B video signal. The delay devices 40 and 41 each effect a delay of T, which is a compensating delay to compensate for transmission delays elsewhere in the circuitry. The outputs of the delay devices 40 and 41 are supplied to respective inputs of a multiplier 42, the output of which is a zero motion vector value which is used in the other paths as will be described below.

The first to nth paths are generally similar to one another, and the first path will be described as an example. In the first path the field A video signal is supplied to two series-connected delay devices 43 and 44. The output of the delay device 43 is connected to two series-connected delay devices 45 and 46. The field B video signal is supplied to two series-connected delay devices 47 and 48. The output of the delay device 47 is connected to two series-connected delay devices 49 and 50. The delay devices 43 and 47 effect delays of $T-V/2-S/2$, the delay devices 44, 46, 48 and 50 effect delays of S, and the delay devices 45 and 49 effect delays of V, where V is one field delay and S is a one sample (that is, one pixel) delay.

The outputs of the delay devices 43 and 50 are supplied to respective inputs of a multiplier 51, the outputs of the delay devices 46 and 47 are supplied to respective inputs of a multiplier 52, the outputs of the delay devices 44 and 49 are supplied to respective inputs of a multiplier 53, and the outputs of the delay devices 48 and 45 are supplied to respective inputs of a multiplier 54. The outputs of the multipliers 51 to 54 are supplied to the positive inputs of respective subtracters 55 to 58, to the negative inputs of each of which is supplied the zero motion vector value referred to above. The purpose of this subtraction step is to reduce some of the undesirable correlation products, and the inclusion of this step is preferable, but not essential.

The outputs of the subtracters 55 to 58 are supplied to respective identical paths each comprising a series-connected low-pass finite impulse filter 59, multiplier 60 and subtracter 61. The low-pass filters 59 have a cut-off frequency of approximately 1 MHz. A two-dimensional low-pass filter may also be used here if required. The design of this filter must again ensure minimum overshoots in the time domain in order to prevent spurious motion vector selection. The low-pass filters 59 will therefore be characterized by a gentle roll-off characteristic.

Cross correlation could involve simply multiplying two signals and, after low-pass filtering in the low-pass filters 59, noting the filter output. Thus the multiplication step results in an output which contains both the sum and the difference of the two input frequencies, and the low-pass filters 59 remove the sum frequency component. The step of subtracting the zero motion vector value in the subtracters 55 to 58 has the effect of eliminating the sum frequency component altogether in many cases, and this simplifies the design of the low-pass filters 59. This is explained in more detail below.

The filtered signals may, at this point be sub-sampled for the purpose of reducing the hardware requirements. Sub-sampling is permissible because the signals have a relatively low bandwidth.

Each signal is now subjected to scaling and weighting in dependence on the motion vector magnitude. Scaling involves multiplication in the multiplier 60 by a factor less than unity which reduces the magnitude of the associated motion vector signal, progressively to attenuate motion vectors of relatively large value. Weighting is a process in which a value, proportional to the motion vector magnitude, is subtracted in the subtracter 61 from the magnitude of the associated motion vector signal. Both scaling and weighting have the effect of reducing the chance of large motion vectors being selected. Both processes may be achieved using a look-up table stored in a PROM, the required characteristics being determined, for each processing path, by the appropriate scaling and weighting factors.

The final stage of the motion vector detection is the selection of the optimum motion vector. This is achieved, in principle, by the use of a magnitude detector forming a vector selector 62, the purpose of which is to locate the path with the largest magnitude. Again, however, due to the fact that the video signal is sampled and the correlation process is not continuous, a search algorithm is applied as described in more detail below.

The form and operation of the field to frame converter 1 (FIGS. 1 and 2) and of the motion vector detector 7 (FIGS. 1 and 3) will be better understood from the following description.

One of the most difficult aspects of any form of vector estimation is avoiding selection of wrong values. There are many individual static and dynamic frequencies where a wrong vector value may be selected (with obvious impairments of the final image). The problem can be summarized as being easy to generate a 'good' vector most of the time, but difficult to avoid 'bad' vectors all of the time. Unfortunately, selection of 'bad' vectors occasionally seems to draw the eye more than selection of 'good' vectors.

There are two basic types of vector detector: square difference and product. Each have their derivatives.

In the square difference case, samples are subtracted and the error is squared with the aim of detecting a minimum value. An alternative to this is the mean absolute difference approach, in which the result is effectively the square root of the square difference result.

In the product case, which is used in embodiments of the present invention, samples are multiplied with the aim of detecting a peak or maximum value. This is essentially the process of cross correlation.

The standard theory of sampling in one, two and three dimensions is well documented. Less well understood is the effect of sub-sampling one axis of a two-dimensional (or three-dimensional) image. Such sub-sampling causes effects on all axes of the original image. Generally, alias effects can be avoided by correctly pre-filtering the source prior to decimation thereby removing any potential alias frequencies. However, video signals are not really that simple, and it is only the application of interlace which misleads the eye for most pictures. In a slow-motion replay of an interlaced source, the temporal averaging effect of the eye is no longer effective, and many aliased frequency components will become visible. FIGS. 4a to 4c illustrate this. In each figure the upper and lower horizontal lines represent the Nyquist limits. Each figure on the right represents the result of 2:1 vertical sub-sampling of the signal represented to the left.

FIG. 4a shows the concept of a source picture with no vertical component (that is, all lines are the same). The spectral energy lies completely along the horizontal axis and sub-sampling the vertical axis has no effect. FIG. 4b shows the same source picture, but with the energy rotated about the zero point. In this case, edge information is lying on a diagonal axis. Sub-sampling of this source will result in the incorrect interpolation of negative alias frequencies. Application of a complementary gradient vector will rotate the edge axis back along the horizontal axis and negate the alias effects. FIG. 4c illustrates the same point as FIG. 4b but with an increased angle of rotation. The conclusion to be derived is that vertical sub-sampling can result in aliasing of horizontal components with the impact of the alias being dependent on the edge angle of the source. Very shallow angled edges will result in alias frequencies at a very low horizontal frequency.

A most important point is that it is only possible to interpolate non-aliased frequencies. By definition, a lone alias frequency is indistinguishable from a non-aliased frequency and will be interpolated as if non-aliased. The object of a vector compensated system is to compensate both aliased and non-aliased frequencies up to a given frequency limit (and without attenuation) on the basis that images are not represented by individual frequencies, but by a set of frequencies. Since low frequencies generally dominate such a set it becomes possible to use these to steer all the frequencies of the set and thus to dealias all frequencies in that set. In many cases, this concept can work very well, but there are always instances where this does not work, mostly where high frequencies dominate. It is easy to envisage simple edges for detection, but in practice an image is typically very complex and edges may not align perfectly. Both the frequency and phase components of the source signals may differ and another edge may be incorrectly detected. In order to test such conditions a zone plate has been used. Not only do the phases and frequencies not align perfectly, but any errors are visibly obvious.

In order to interpolate any source picture correctly, an understanding of the sampling process is required.

Consider the original sources: A and B. These are defined to represent all frequencies within the Nyquist frequency limits.

To offset A from B by 2n pixels;

Move A by +n pixels; move B by −n pixels about a centre point.

The spectrum of A is therefore modified to become $A \cdot e^{j\omega nt}$ and that of B becomes $B \cdot e^{-j\omega nt}$.

Figure 5:
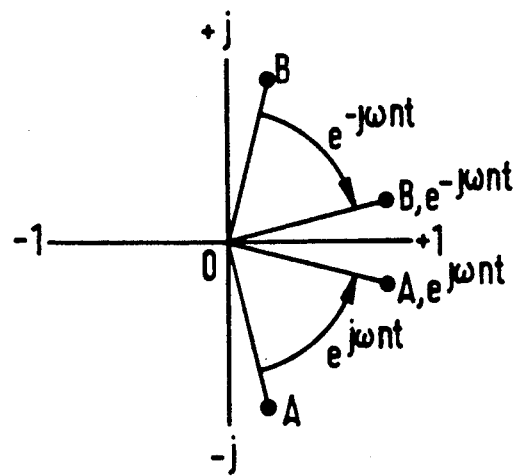

The effect is that the frequency components of both sources A and B have been modified by a rotation in the z-plane; A by an anti-clockwise rotation, B by a clockwise rotation. Any process now applied to these sources must take account of these rotations. The angle of rotation is ($\omega nt$), so is in proportion to both the vector offset and the source frequency. FIG. 5 demonstrates this. The relative frequency spectral relationship between A and B is therefore modified by $e^{-2j\omega nt}$ thus impinging a frequency error between the two sources. This process is essential, since the vector offset is intended to invert alias frequencies in order to cancel their distorting effect when the vector assisted interpolation is performed. Unfortunately, the vector detector also has this frequency error and this can result in incorrect vector selection where a frequency exceeds $\omega_n/n$. At the frequency $\omega_n/n$ and all harmonics, the relative phase shift between the two sources results is an exponential term of $e^{-j2\pi}$, producing a frequency that is indistinguishable from the zero term. High frequencies may therefore see many matches across the vector offset range. Multiple low-pass filters could be used in the vector detector, with a cut-off frequency $\omega_{c/o}$ defined by:

$$\omega_{c/o} = \omega_n/n$$

The application of these low-pass filters would ensure that only non-aliased frequencies were used in the vector detection process and thereby prevent incorrect vector selection.

However, low-pass filtering of this type, although solving the alias problem, also prevents detection of some types of heavily aliased high frequency signals. It is therefore desirable to remove this low-pass filtering action to be replaced by some other technique.

The problem associated with removing the low-pass filters is the multiplicity of vectors which appear to be optimum. The number will generally be in proportion to the vector magnitude. On such signals as the zone plate, in the high frequency regions the optimum vector selection points may be:

| −7 | −5 | −3 | −1 | 1 | 3 | 5 | etc |
|----|----|----|----|---|---|---|-----|
| x  | o  | x  | o  | x | o | x |     | where:
o = correct interpolation phase, error = 0;
x = incorrect interpolation phase, error = $\pi$.

Assuming that in the example above, the correct vector is −1, the result will be a correctly aligned interpolation. Unfortunately, the two nearest vectors are 1 and −3 both of which will result in an interpolated signal with a phase error of $\pi$ (that is, inverted polarity). Such choices will result in severe picture degradation. Scaling the vector amplitudes is one method of ensuring a correct choice of vector. By applying a scaling factor as a function of the vector magnitude, unnecessary selection of high magnitude vectors can be avoided. The major problem however, concerns the choice of a positive or negative vector 1 or −1.

The product method of vector detection will now be further described.

Generally, given source signals A and B, shifting by $e^{j\omega nt}$ and $e^{-j\omega nt}$ respectively result in the modified sources:

$$A \cdot e^{j\omega nt} \text{ and } B \cdot e^{-j\omega nt}$$

The product of these two sources is:

$$A \cdot B \text{ (since the } e^{j\omega nt} e^{-j\omega nt} \text{ terms cancel)} \quad (1)$$

In a more general frequency response sense, and adding a scaling factor of $\sqrt{2}$ for convenience of equation reduction, we have:

$$A \cdot B = \sqrt{2} \cdot \cos(\omega_1 t + \phi_1) \times \sqrt{2} \cdot \cos(\omega_2 t + \phi_2)$$

which resolves to:

$$A \cdot B = \cos(\phi_1 - \phi_2) \cdot \cos(\omega_1 t - \omega_2 t) + \quad (2)$$
$$\sin(\phi_1 - \phi_2) \cdot \sin(\omega_1 t - \omega_2 t) +$$
$$\cos(\phi_1 + \phi_2) \cdot \cos(\omega_1 t + \omega_2 t) +$$
$$\sin(\phi_1 + \phi_2) \cdot \sin(\omega_1 t + \omega_2 t)$$

Figure 6:
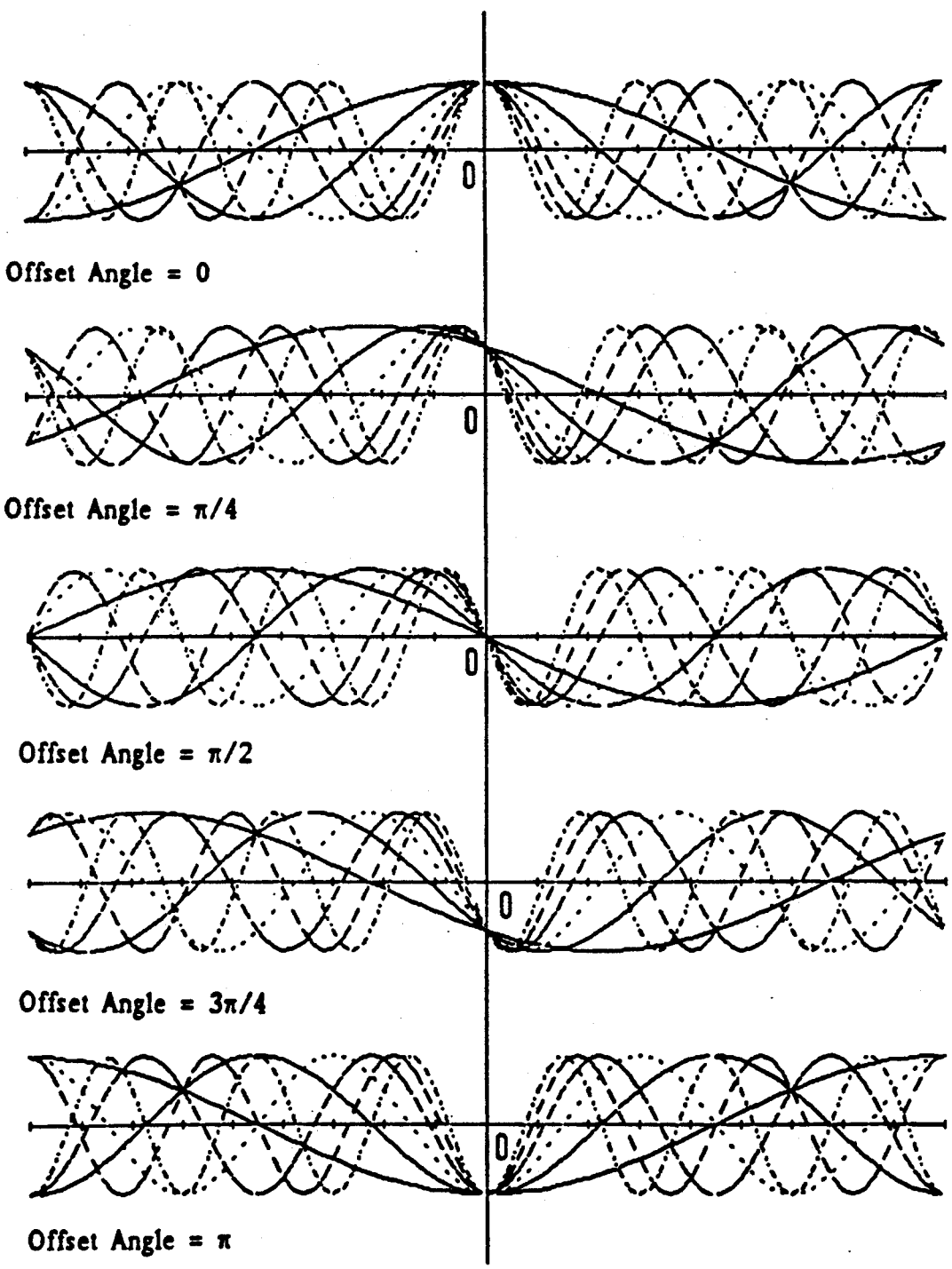

Under normal conditions, the third and fourth lines of equation (2) may be ignored leaving only two terms. FIG. 6 shows a set of frequency responses of a product vector detector for phase differences of 0, $\pi/4$, $\pi/2$, $3\pi/4$ and $\pi$. The curves represent the part of equation (2) including the difference components that is, the first two lines). $\phi_1 - \phi_2$ is the offset angle between line pairs (0 to $\pi$). The ordinates are amplitude (A·B), and the abscissae are frequency ($\omega_1 t - \omega_2 t$) from $-\pi$ to $+\pi$. In general, for a given phase offset between two lines, the frequency response simplifies to:

$$A \cdot B = K_1 \cdot \cos(\omega_1 t - \omega_2 t) + K_2 \cdot \sin(\omega_1 t - \omega_2 t) \quad (3)$$

where $K_1^2 + K_2^2 = 1$.

Figure 7A:
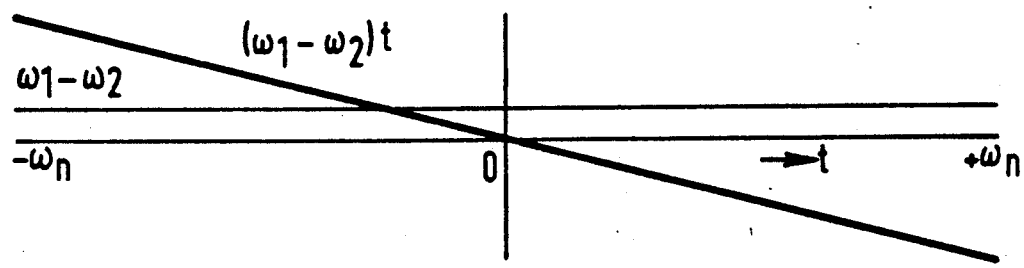
FIGS. 7a and 7b show separated contributions of sum and difference components of product vector detection.
Figure 7B:
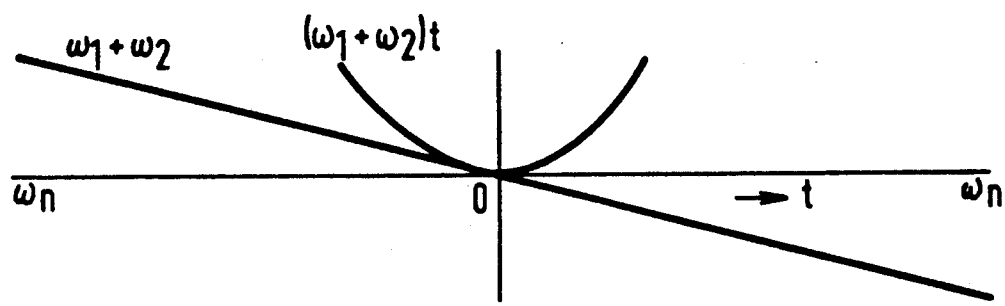

For the greater part of the zone plate, equation (3) holds true. However, at the transition between positive and negative frequencies, one of the frequencies is inverted with the effect that all four lines of equation (2) play an active part. FIG. 7 illustrates the effect each pair of lines of equation (2) has on a zone plate. The first pair of lines produces positive results for positive frequencies and negative results for negative frequencies as described (FIG. 7a). The net effect of this characteristic is to produce a cosine component (0°) and a sine component (90°) resulting in a shifted cosine waveform where the peak indicates the optimum point of phase correlation. By contrast, the terms of the second pair of lines of equation (2) produce positive results with the ($\omega_1 t = \omega_2 t$) term being parabolic. This leads to a rectified frequency sweep as shown in FIG. 7. At high frequencies this component is removed by filtering, but at low frequencies serves to introduce a dc error term which can substantially affect the results. In particular, at frequencies close to zero, a high valued positive vector may be inverted with visible impairments resulting.

It may be said that such a situation is unlikely in practice, the zone plate being a very untypical signal. However, this low frequency effect has been noticed on actual pictures, around the edges of circular objects, and cannot be ignored. The effect of this interference depends on the values of $(\phi_1 - \phi_2)$ relative to $(\phi_1 + \phi_2)$ and therefore on the absolute phases of each line of A and B.

In order to reduce the effect of this interference, consider the following.

The zero offset vector response is given by:

$$A_0 \cdot B_0 = \cos(\phi_1 - \phi_2) + \cos(\phi_1 + \phi_2) \cdot \cos(2\omega_0 t) + \sin(\phi_1 + \phi_2) \cdot \sin(2\omega_0 t) \quad (4)$$

since $(\omega_1 t - \omega_2 t) = 0$.

For a linear frequency sweep $(\omega_1 + \omega_2) = 2\omega_0$, hence subtracting equation (2) from equation (4) cancels the $(\omega_1 + \omega_2)$ terms and leads to:

$$A_n \cdot B_n - A_0 \cdot B_0 = \cos(\phi_1 - \phi_2) \cdot (\cos(\omega_1 t - \omega_2 t) - 1) + \sin(\phi_1 - \phi_2) \cdot \sin(\omega_1 t - \omega_2 t) \quad (5)$$

The result is now devoid of the $(\omega_1 + \omega_2)$ terms and the interference removed. Of course, the concept of equating $(\omega_1 + \omega_2) = 2\omega_0$ is limited to linear frequency sweeps as occur in the zone plate, but for many other signals this also holds true. What is being assumed is that the frequency component at the zero vector point is the average of the frequencies at each of the non-zero vector points, which in a very reasonable assumption.

Figure 8:
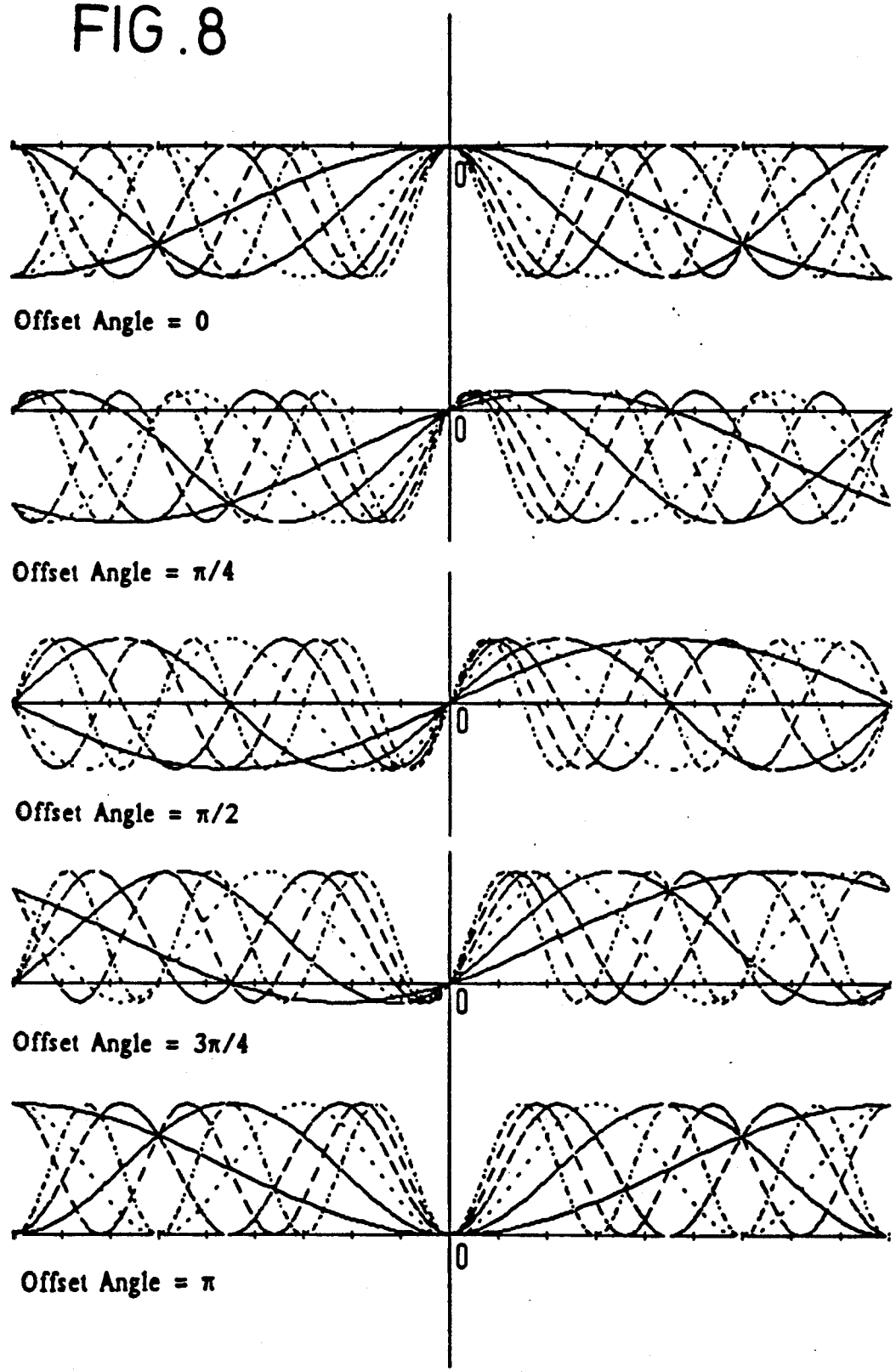

The results of equation (5) are shown in FIG. 8 with phase offsets of 0, $\pi/4$, $\pi/2$, $3\pi/4$ and $\pi$.

One remaining point concerns the assumption of dc free signals. Any dc component present in the sources will complicate the result by adding components of the original source frequencies. To reduce this problem, and to reduce any residual interference components, it is necessary to high-pass filter both source signals A and B. Additionally, low-pass filtering of the correlator output is necessary to remove residual high frequency components.

Figure 9:
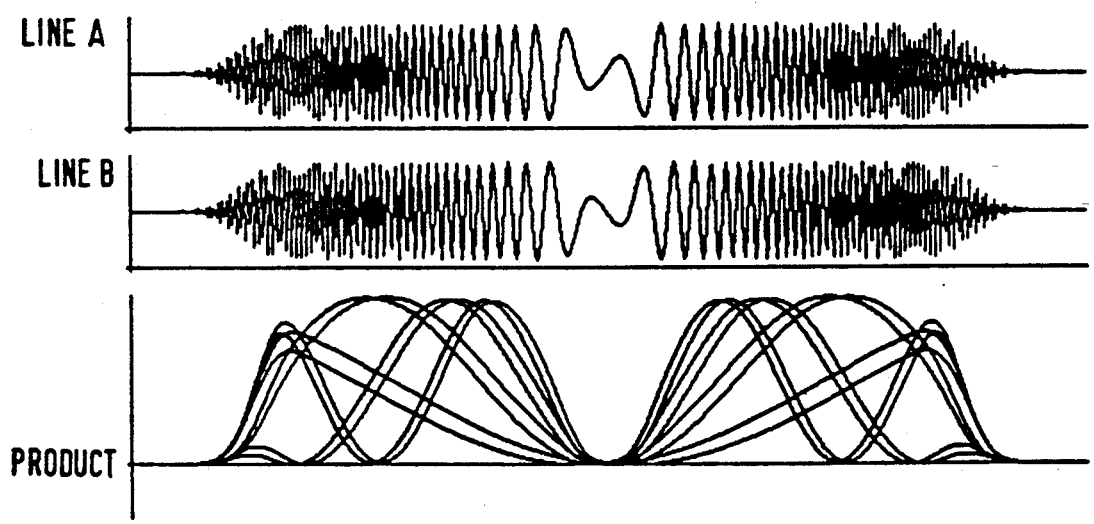

Consider two lines of a zone plate, where the phase offset between the two lines is close to $\pi$. FIG. 9 shows the responses over the range $-\omega_n$ to $+\omega_n$ for the set of gradient vectors; 0, $+/-1$, $+/-2$, $+/-3$ and $+/-4$ pixels. These clearly show that at the threshold frequency, $\omega_n/x$ for each vector magnitude x, the negative vector begins to exceed the positive vector.

The root cause of the vector errors lies not in frequency distortion, but in the correlation amplitude characteristic. This is due to the discrete nature of the vector magnitudes (which in turn are defined by the source sampling rates) resulting in a discrete correlation amplitude response. The discrete results of FIG. 9 show 'holes' where incorrect vectors could be selected thereby allowing the possibility of incorrect vector selection. If the vector magnitudes were continuous, then no such holes would be apparent, and the optimum vector would always be chosen. The problem here is the implication that an almost infinite number of vector magnitudes must be created together with very high over-sampling of the source signals.

Figure 10A:
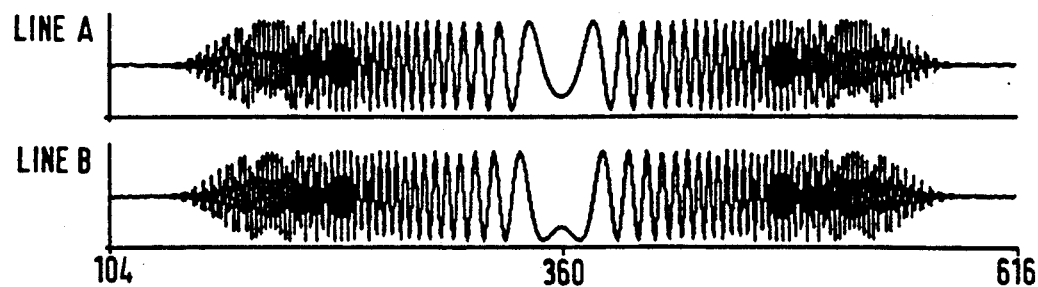
FIGS. 10a to 10c show outputs from simulation software for a zone plate input, FIG. 10a showing input source signals, FIG. 10b showing correlation profiles at points along the source signals, and FIG. 10c showing detected vector offset with output signal and error.
Figure 10B:
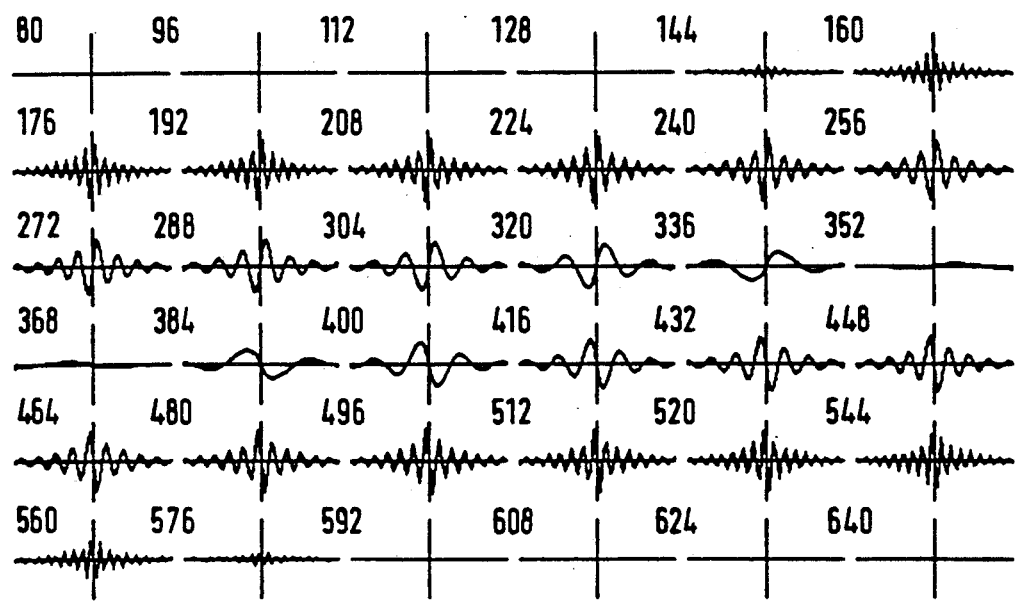

Consider now, the vector profile for each pixel, where the profile is the correlation magnitude plotted against vector magnitudes. FIG. 10b shows 36 such profiles taken from samples of two lines (FIG. 10a) of a zone plate. It is apparent that the profiles have adopted the sampling structure of the original source signals (together with some of those signal's characteristics). This profile provides a means of detecting the optimum vector magnitude. In particular, the profiles can be subjected to linear interpolation. This allows the creation of intermediate vector terms with the consequent extension to a potentially continuous profile. Such a technique, although theoretically feasible, would be a very expensive process. The problem can however be greatly simplified by using a special search algorithm to locate the peak. In particular, looking at the profile of lines such as number 144 in FIG. 10b, it is evident that the high source frequency has led to an equally high vector profile frequency. Such high frequencies are subjected to severe errors on a sample by sample basis and their true values at any one point can only be decided by interpolation across many other points. It is easy for the wrong vector polarity to be selected in such a case. However, only the first peak (each side of the zero axis) needs interpolation. Therefore, the method for deciding the optimum vector is as follows:

1. apply vector magnitude dependent scaling and threshold factors
2. search for the first positive vector peak
3. search for the first negative vector peak 4. if the vector magnitude associated with these two peaks is less than (say) six, interpolate intermediate samples up to one sample either side of each peak to determine the true correlation peak and position
5. move up to the remaining vectors and select a larger peak if one occurs
6. select the larger of the two peaks (positive and negative).

The scaling characteristic is designed progressively to attenuate large vectors of large magnitude in order to ensure that the smallest vectors dominate. Inspecting FIGS. 9 and 10, it is obvious that some weighting must be applied, because at any one frequency there are potentially many solutions. The scaling will depend on the degree of intermediate sample interpolation performed, and the degree of accuracy required.

The threshold factor serves a different purpose. This term is in proportion to the vector magnitude and is subtracted from the (scaled) correlation result. Therefore larger magnitudes are reduced by a proportionally larger value. This is intended primarily to remove the effects of low frequency interference on such critical sources as the zone plate and is only used at a low level (if at all).

Note that both the scaling and weighting factors will tend to reduce the chance of larger vector magnitudes. This may be of benefit to some sources but deleterious to others. It is suggested that these two controls be available to a user in order to allow a degree of control on critical material. Such controls may also be associated with a time code for dynamic variations.

Figure 10C:
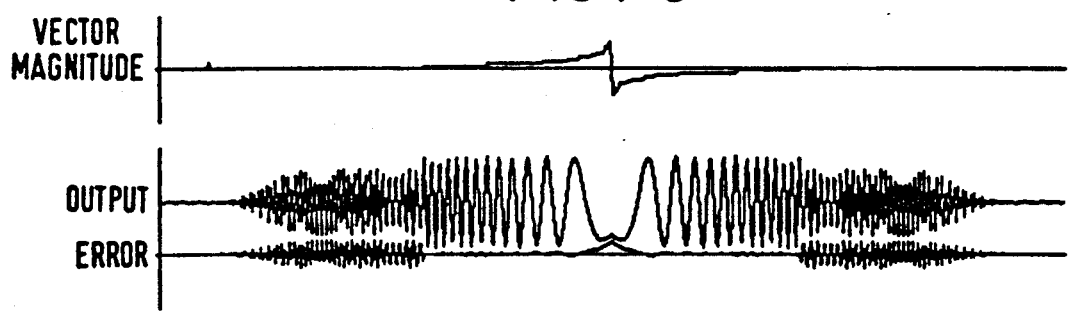
Figure 11A:
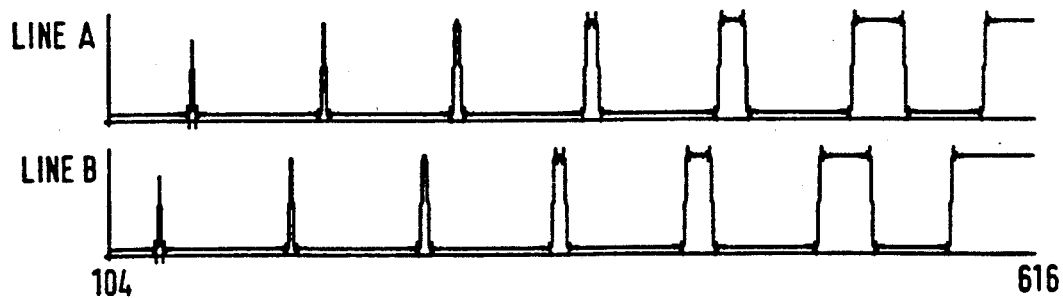
FIGS. 11a to 11c show outputs from simulation software for a test pattern input, FIG. 11a showing input source signals, FIG. 11b showing correlation profiles for selected samples, and FIG. 11c showing selected vector offset, reconstructed signal and error.
Figure 11B:
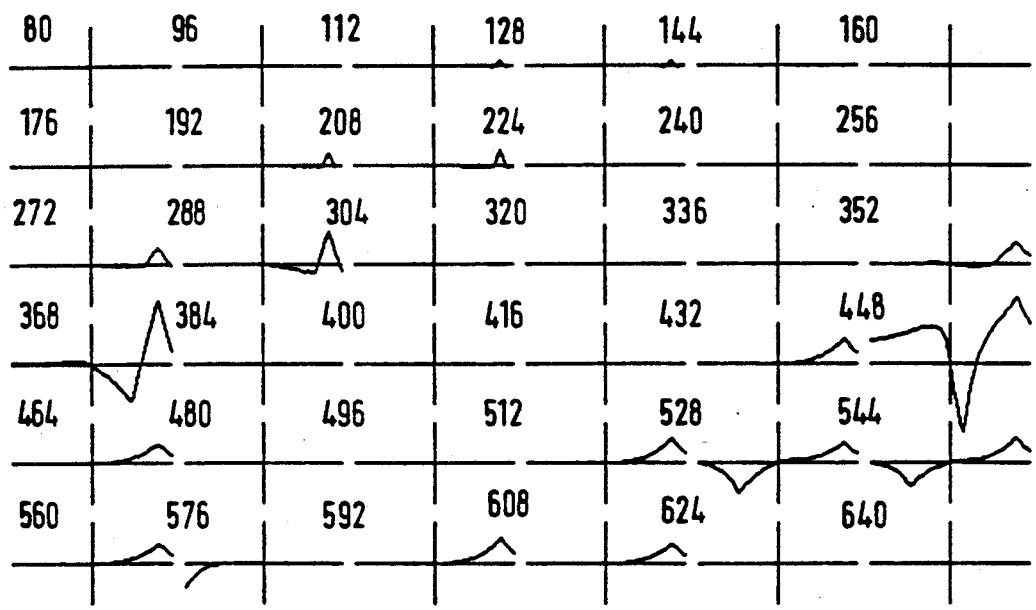
Figure 11C:
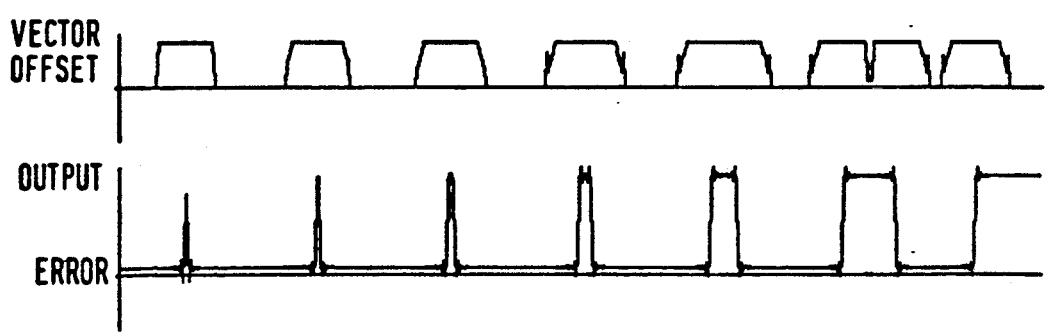

The results of this vector detection result in a vector magnitude as indicated in FIGS. 10 and 11. FIG. 11a shows the input source signals. FIG. 11b shows the correlation profiles for selected samples, and FIG. 11c shows vector magnitudes selected, the reconstructed signal and the error.

The basic vector detector block schematic diagram is shown in FIG. 2 described above. The common high-pass filter 12 is used to remove the dc component and some low frequencies. This output is passed to the multiple paths of correlator elements, where each element consists of delay devices, and multipliers. From the output of each correlator element is subtracted the zero vector component (see equation (5)), and the results are multiplexed and fed to a series of vector detector elements.

Figure 12:
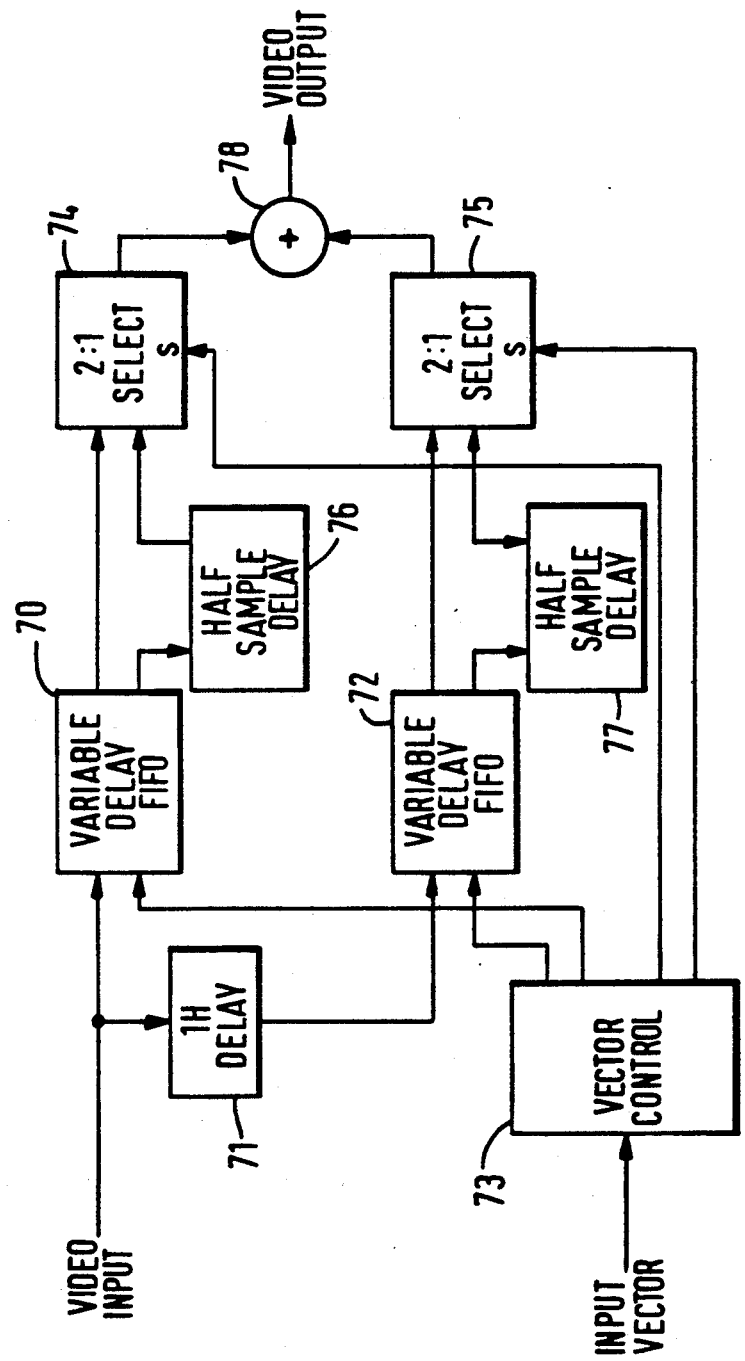
FIG. 12 is a block diagram of a gradient vector assisted interpolator.

Once the optimum motion vector has been estimated, the interpolation can be achieved with the block diagram of FIG. 12 which shows a gradient vector assisted vertical interpolator, which basically uses linear interpolation. In this interpolator, the input interlaced video signal is supplied directly to a variable delay first-in-first-out (FIFO) memory 70, and by way of a 1H delay device 71 to a similar FIFO memory 72. The input gradient vectors are supplied to a vector control device 73 which derives therefrom vector shift values which are supplied to the memories 70 and 72 to control the delays thereof. Outputs of the memories 70 and 72 are supplied to first inputs of 2:1 selectors 74 and 75 respectively, and by way of respective half sample delay devices 76 and 77 to second inputs of the selectors 74 and 75 respectively. The outputs of the selectors 74 and 75 are added by an adder 78, the output of which is the required progressive scan converted video signal.

Referring again to FIGS. 2 and 3, the choice of filter cut-off frequencies for both the high-pass filters 12 and 36, and the correlation low-pass filters 26 and 59 must be made with some care. It should be noted that the process of correlation does produce double frequency components and these can alias down to low frequencies with consequent distortion of the correlation result. The input signal is therefore pre-filtered by the low-pass filters 11 and 35, preferably to an upper band limit of 5.5 MHz. The maximum product frequency is therefore 11 MHz, giving rise to an alias frequency of (13·5−11)=2.5 MHz. The correlation low-pass filters 26 and 59 should have a very low output response at this frequency. More generally, any complementary pair of low-pass filters 11 and 26, or 35 and 59 can be used so long as:

$$f_o < f_s - 2f_1$$

where
 $f_o$ is the second low-pass cut-off,
 $f_s$ is the first low-pass cut-off, and
 $f_s$ is the sampling frequency.

A 31 tap (sixteen tap symmetric) finite impulse response filter has been used as the low-pass filters 26 and 59, giving both good performance and being easily achievable through the application of single chip digital filters (in particular, type CXD2200). The response at 2.5 MHz is suitably low.

The choice of the high-pass filters 12 and 36 is less demanding in the implementation sense since there is only the one. However, the characteristics of the high-pass filters 12 and 36 can have a substantial effect on the overall system performance. The low frequency cut-off point must be low enough to allow a larger vector to produce its first peak. For a maximum vector magnitude of 24, the low frequency cut-off point should be less than $\omega_n/24$. The response does not have to be of the standard brick wall type but may show a more gentle response. A Hilbert high-pass filter is particularly suitable since it does not have a cut-off frequency as such, but a gently rising sinusoidal type of characteristics with negative output at negative frequencies, zero output at zero frequencies, and positive output at positive frequencies. It also has the benefit of distinguishing between positive and negative image edges. A Hilbert filter sixteen taps in length (eight tap negatively symmetric) has been used.

The form and operation of the overall television standards converter (FIGS. 1 and 3) will be better understood from the following additional description.

As mentioned above, the object of a vector detector is to ensure a match between two similar signals. This match may be intuitively obvious for many signals, but can, unfortunately, be surrounded by alternative matches producing completely wrong results. The crux of vector detector design is to avoid the wrong matches.

In general, the effect of shifting signals to test for a match is to impinge a frequency response error on each shifted signal. Consider signals A and B. If (and only if) A and B are shifted equally towards each other by half the vector offset then the effect of multiplying becomes:

$$A \cdot e^{-j\omega_n t} \times B \cdot e^{j\omega_n t} = A \cdot B \qquad (7)$$

that is, the effect of cross-correlating signals about a centre point does not impinge a frequency error on the result.

The principle outlined here is easily extendable into a two-dimensional shift as follows:

$$A \cdot e^{-j\omega nt} \cdot e^{-j\omega vt} \times B \cdot e^{j\omega nt} \cdot e^{-j\omega vt} = A \cdot B \qquad (8)$$

where:

h=horizontal vector magnitudes, and
v=vertical vector magnitude.

Therefore, if the signals (objects) are moved equally and symmetrically towards each other, there is no deleterious frequency response offset.

However, although ideal signals can be matched in this way, realistic pictures do not necessarily produce easily interpreted results. It was shown above that a source such as a zone plate can easily produce results which will be mis-interpreted to produce erroneous vector detection. Two particular problems were identified:

1. at high frequencies, the sampled nature of the source signals and the discrete values of the offset magnitude was found to result in incorrect vector selection, and
2. at the cusp of circular objects/rings, a low frequency interference was introduced, again causing incorrect vector selection.

In the former case, an ideal solution exists through linear interpolation (but with attendant increased processing). However, in the second case no perfect solution has been found. Reduction of the low frequency interference can be achieved through the adoption of a vector weighted threshold progressively to offset the level of interference.

The following vector magnitude ranges are used:
Horizontal magnitude range=+/−24 pixels,
Vertical magnitude range=+/−16 lines (of a frame).

This range is adequate for most video sources. The price for extending the ranges beyond this is two-fold:

1. larger volumes of circuitry, and
2. a greater probability of selecting an erroneous (and large) vector magnitude.

The first point is obvious; the second point requires a further explanation. Referring back to the discussion of spatial interpolation, this analyzed extensively the effects of low frequency interference on a zone plate input. The analysis was specifically for that source, but could be related to spatial interpolation around the tops and bottoms of any circular object. The analysis was required, because in extending the vector magnitude range from +/−16 pixels to +/−24 pixels, the low frequency interference had become large enough to produce noticeable effects. Furthermore, there is no known compensation for this interference apart from using a threshold detector to reduce the interference level. From this observation, it is apparent that the low frequency interference component (and its effects) will become more serious with further increases in the vector magnitude range.

The motion vector detector and the interpolator both require progressive scan frames, rather than fields, and these are derived as described above.

Figure 13A:
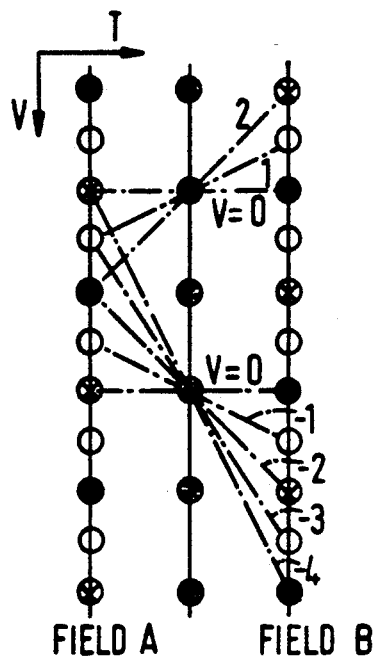
FIGS. 13a and 13b respectively show motion interpolation across fields and spatial interpolation across lines.
Figure 13B:
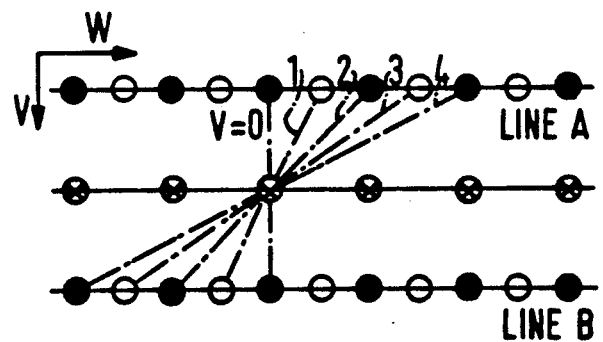

FIGS. 13a and 13b show the concept of motion vector assistance in terms of a vertical offset (FIG. 13a) and a horizontal offset (FIG. 13b). The requirement for sub-line and sub-pixel resolutions is in order to ensure that the motion vector is centred on the output pixel, and that the output pixel is generated in the correct spatial position. The interpolation is symmetrically positioned between the two sources thus simplifying (at this stage) the sub-line and sub-pixel requirements considerably.

The block diagram for the motion vector detector shown in FIG. 3 is referred to above. Initially it was believed that all the filters would have to be two-dimensional rather than the one-dimensional spatial filters. However, this view has been modified by the realization that a Hilbert high-pass filter cannot be implemented in two-dimensional form. A symmetrical filter can be created for two-dimensional filtering by the following method:

1. low-pass filter horizontally
2. low-pass filter vertically
3. subtract the result from the source signal The Hilbert filter produces an 'imaginary' output, that is the output signal has a 'j' term. The problem in trying to produce a two-dimensional Hilbert high-pass filter is:

1. there is no low-pass filter associated with the Hilbert high-pass filter,
2. the multiplication of 'j' horizontally by 'j' vertically would result in the loss of the imaginary component vital for the definition of a Hilbert filter.

As a general observation; consider an image of a circular object. A conceptual vision of the ideal output would be narrow rings defining the inner and outer edges of the object. This can be achieved with an ordinary two-dimensional high-pass filter but not a Hilbert type filter.

This conclusion meant that the Hilbert filter of the gradient vector detector (FIG. 2) could not be implemented in the motion vector detector (FIG. 3) in the obvious way.

As a result of this conclusion, it was subsequently recognized that it is not necessary to use two-dimensional filtering. If the vector detection is accurate and reliable, it is possible to use only one-dimensional processing, with all the resulting hardware benefits. The two possibilities are therefore:

1. two-dimensional filtering throughout with a symmetrical high-pass filter,
2. one-dimensional filtering throughout with a Hilbert high-pass filter.

Figure 14:
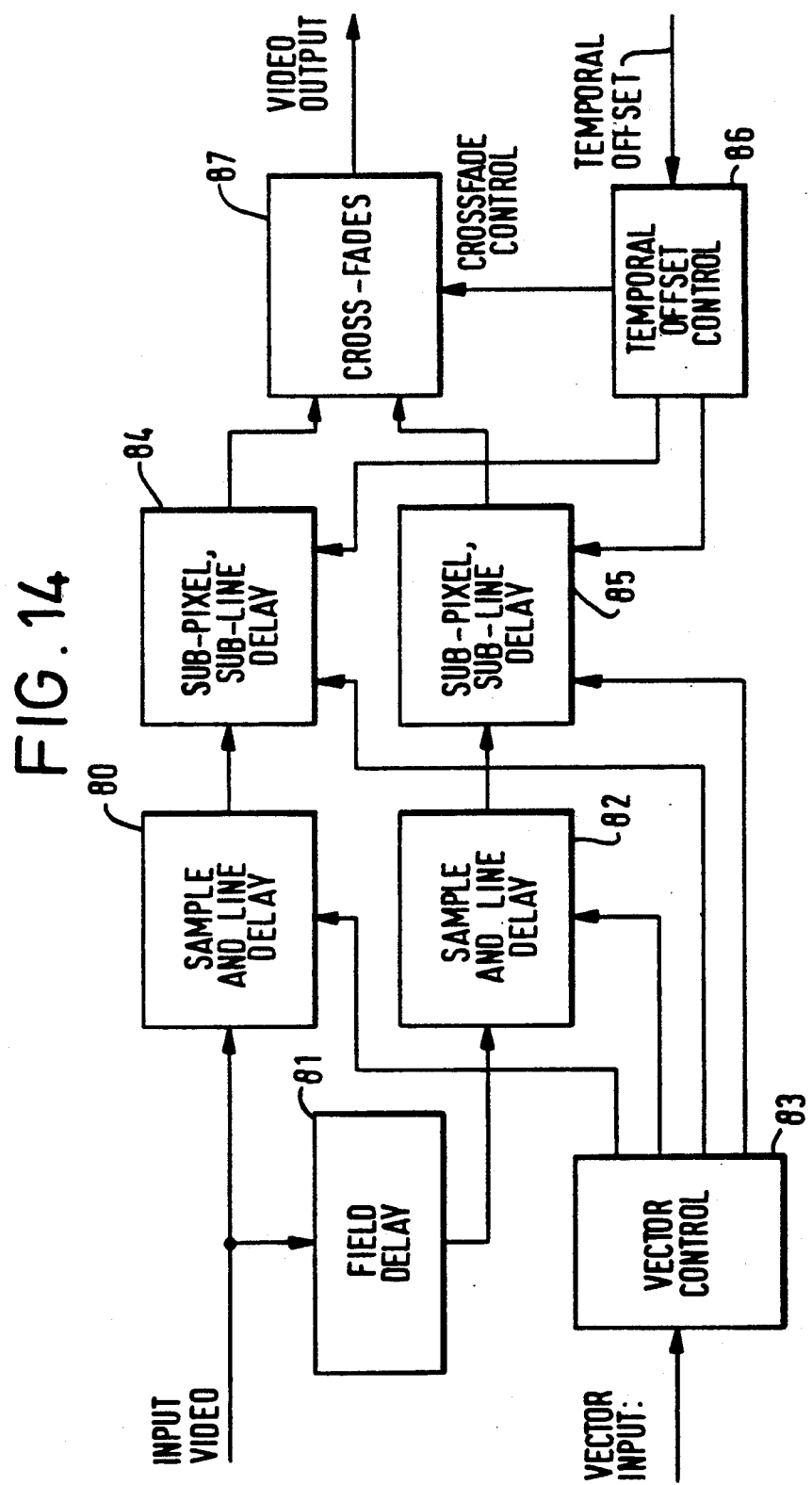
FIG. 14 is a block diagram of a motion vector assisted interpolator.

FIG. 14 shows the basic block diagram for spatial and temporal interpolation using motion vector assistance. This is the function performed by the vector offset device 8 and the adder 9 of FIG. 1, and is generally similar to the function of the interpolator (FIG. 12) used for spatial interpolation, with the addition of the additional dimension for line shifting purposes.

Referring to FIG. 14, in this interpolator, the input progressive scan converted video signal is supplied directly to a sample and line delay device 80 and by way of a field delay device 81 to a similar sample and line delay device 82. The input motion vectors are supplied to a vector control device 83 which derives therefrom vector shift values which are supplied to the delay devices 80 and 82, and also to sub-pixel sub-line delay devices 84 and 85 to the inputs of which are supplied the outputs of the delay devices 80 and 82 respectively. The required temporal offset, that is a signal representing the temporal position of the required output field relative to the two adjacent input frames, as determined by the required standards conversion, is supplied to a temporal offset control device 86 which derives therefrom temporal shift values which are supplied to the delay devices 84 and 85, and also derives a control signal which is supplied to a cross-fader 87. The cross-fader 87 receives inputs from the delay devices 84 and 85, and combines these inputs in proportions determined by the control signal to form the required standards converted output video signal. The cross-fader 87 may simply operate linearly or it may be a raised cosine type cross-fader.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A television standards converter for converting an input digital video signal from one television standard to another, the standards converter comprising:
    a high-pass filter for filtering said input video signal horizontally and vertically;
    a plurality of parallel processing channels comprising respective means for determining, pixel by pixel of the high-pass filtered video signal, motion vector magnitudes and correlation magnitudes for a range of horizontal and vertical pixel offsets;
    respective low-pass filters for filtering said correlation magnitudes;
    means for determining for each pixel of said video signal, from the relationship between the respective motion vector magnitude and correlation magnitude, a motion vector corresponding to the maximum correlation magnitude; and
    a temporal interpolator for deriving interpolated fields or frames by combining sample values offset by the motion vectors determined to correspond to the maximum correlation magnitudes.

2. A converter according to claim 1 wherein said maximum correlation magnitude is determined by applying scaling and threshold values to said motion vectors; locating the first positive and negative motion vector peaks; if the motion vector magnitude associated with these two peaks is less than a predetermined magnitude, interpolating intermediate samples either side of each of said two peaks; and checking the interpolated samples for a peak larger than said two peaks and, if found, selecting the larger peak.

3. A converter according to claim 1 wherein said high-pass filter and said low-pass filters are one-dimensional filters.

4. A converter according to claim 1 wherein said high-pass filter is a Hilbert type filter.

5. A converter according to claim 1 wherein in determining said motion vectors a scaling factor is applied progressively to attenuate motion vectors of relatively large value.

6. A converter according to claim 1 wherein in determining said motion vectors a threshold value proportional to the vector magnitude is substracted from each said motion vector.

7. A converter according to claim 1 wherein said high-pass filter and said low-pass filters are two-dimensional filters.

8. A converter according to claim 7 wherein said high-pass filter and said low-pass filter are symmetrical finite impulse response filters.

9. A converter according to claim 1 wherein said input video signal is converted from an interlaced digital video signal to a progressive scan digital video signal before derivation of said motion vectors.

10. A converter according to claim 9 further comprising:
    a second high-pass filter for filtering said input interlaced video signal;
    a second plurality of parallel processing channels comprising respective means for determining, pixel by pixel of the low-pass filtered interlaced video signal, gradient vector magnitudes and correlation magnitudes for a range of pixel offsets;
    respective second low-pass filters for filtering said correlation magnitudes;
    means for determining for each pixel of said interlaced video signal, from the relationship between the respective gradient vector magnitude and correlation magnitude, a gradient vector corresponding to the maximum correlation magnitude; and
    a spatial interpolator for deriving interpolated frames of said progressive scan video signal by combining sample values offset by the gradient vectors corresponding to the maximum correlation magnitudes.

* * * * *